United States Patent [19]

Fleming

[11] Patent Number: 5,031,703
[45] Date of Patent: Jul. 16, 1991

[54] ROOT CROP HARVESTER

[75] Inventor: John Fleming, Midlothian, Scotland

[73] Assignee: National Research Development Corporation, London, England

[21] Appl. No.: 439,676

[22] Filed: Nov. 22, 1989

[30] Foreign Application Priority Data

Dec. 2, 1988 [GB] United Kingdom ............... 8828153

[51] Int. Cl.⁵ ............... A01D 13/00; A01D 17/00
[52] U.S. Cl. ............................. 171/130; 171/127; 171/133; 209/308
[58] Field of Search ............... 37/239; 171/50, 55, 171/5 B, 71, 75, 76, 126, 127, 130, 131; 172/33; 198/812, 813; 209/307, 308

[56] References Cited

U.S. PATENT DOCUMENTS

| 1,828,261 | 10/1931 | Stoltenberg | 171/127 X |
| 2,421,999 | 6/1947 | Dahlman | 171/130 X |
| 2,464,305 | 3/1949 | Greaves | 171/130 X |
| 2,974,797 | 3/1961 | Blackman | 209/308 X |
| 3,127,978 | 4/1964 | Zuercher | 198/812 |
| 3,280,977 | 10/1966 | Looker | 209/307 |
| 4,448,257 | 5/1984 | McRae | 171/130 X |
| 4,560,008 | 12/1985 | Carruthers | 171/130 X |

FOREIGN PATENT DOCUMENTS

| 507626 | 9/1930 | Fed. Rep. of Germany | 198/812 |
| 1038817 | 9/1958 | Fed. Rep. of Germany | 171/130 |
| 129888 | 1/1960 | U.S.S.R. | 171/131 |
| 26442 | of 1896 | United Kingdom | 171/130 |
| 2077626 | 12/1981 | United Kingdom . | |
| 2158738 | 11/1985 | United Kingdom . | |
| 2170388 | 8/1986 | United Kingdom . | |
| 2208994 | 4/1989 | United Kingdom . | |

Primary Examiner—Randolph A. Reese
Assistant Examiner—Jeffrey L. Thompson
Attorney, Agent, or Firm—Cushman, Darby & Cushman

[57] ABSTRACT

A root crop harvester comprising a soil-separating primary web arranged to discharge material on to a crop-conveying second web which passes about two rollers adapted to define in the load-bearing run of the second web an overhanging step section.

12 Claims, 2 Drawing Sheets

ROOT CROP HARVESTER

BACKGROUND OF THE INVENTION

The present invention relates to root crop harvesters within which term is to be included potato harvesters. GB Patent Document No. 2208994 discloses a root crop harvester in which the soil-separating primary web is passed in an S-form configuration about two rollers so as to define in the primary web an overhanging step section.

It is a drawback of that previous design that relatively heavy traction is needed to drive the primary web around the step-defining rollers especially when the primary web is heavily-laden.

SUMMARY OF THE INVENTION

According to a first aspect of the present invention, a root crop harvester (as above defined) comprises a soil-separating primary web arranged to discharge material on to a crop-conveying second web which passes about two rollers adapted to define in the load-bearing run of the second web an overhanging step section. The second web may be either an intermediate web discharging on to a secondary web or, if an intermediate web is absent, it may be the secondary web itself.

Preferably, the step-defining rollers may be moved relative to the load-bearing run of the second web so as optionally to provide or not provide the step section as the case may be.

Optionally, the primary web may pass about two rollers adapted to define in the load-bearing run of the primary web an overhanging step section.

According to a second aspect of the present invention, a root crop harvester (as above defined) includes a soil-separating primary web which passes about two rollers which may be moved relative to the load-bearing run of the primary web so as optionally to provide or not provide an overhanging step section therein as the case may be.

Conveniently, in all the various possibilities outlined above, any ability to bring step-defining rollers into and out of a step-defining relationship with the associated web run is achieved by having the step-defining rollers mounted one on each end of a link pivoted for controlled rotational displacement about a horizontal pivot axis.

Conveniently, in such cases, the return run of the web passes around a second pair of step-defining rollers arranged in similar fashion to the rollers of the load-bearing run, the two pairs of rollers being mounted on respective pivoted links which are so coupled that pivotal motion of the second pair of rollers compensates for changes n web path length brought about by pivotal motion of the first pair of rollers.

Conveniently, the pivot axis of the or each link is nearer the roller associated with the higher end of the step section.

The term "rollers" is to be widely interpreted as a functional term which includes any suitable form of rotary support for the web whether of cylindrical or circular or other suitable configuration.

BRIEF DESCRIPTION OF THE DRAWINGS

An embodiment of the invention will now be described, by way of example only, with reference to the accompanying simplified and somewhat schematic drawings in which.

DETAILED DESCRIPTION OF THE PRESENTLY PREFERRED EXEMPLARY EMBODIMENTS

Figure 1:
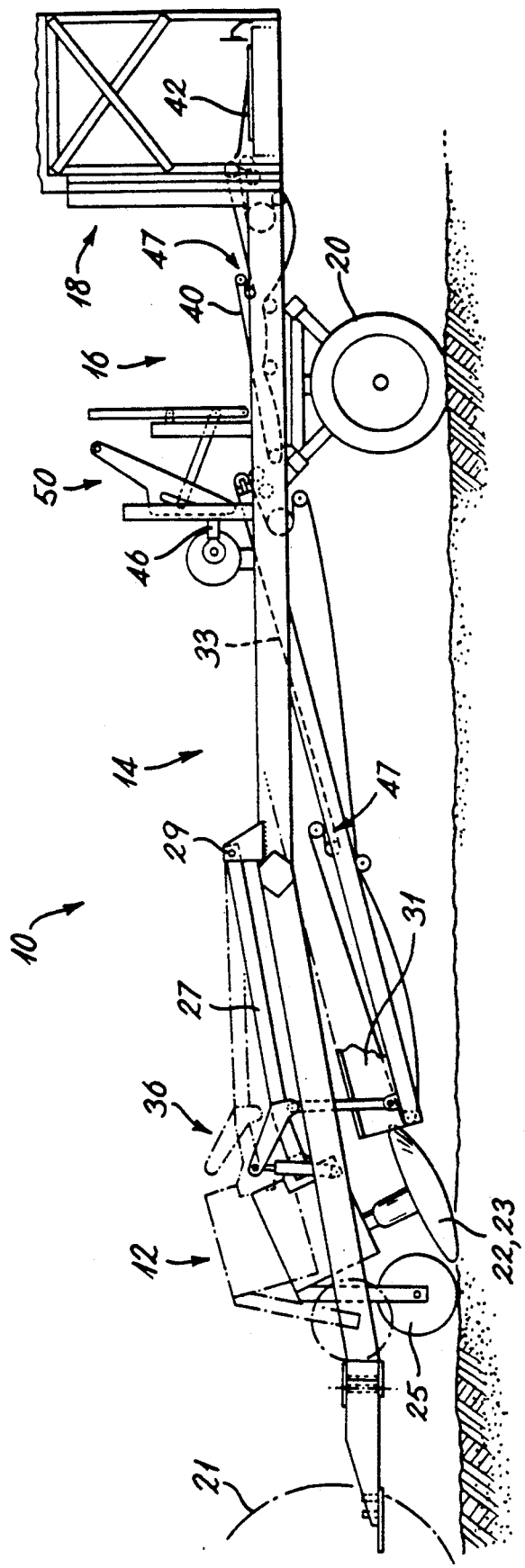
FIG. 1 is a side elevation of a potato harvester in accordance with the invention.

Thus referring now to the drawings, a potato harvester 10 in accordance with the present invention comprises a two-row trailed machine having a crop-lifting front section 12 followed by a soil-separating primary web section 14, a crop-conveying secondary web section 16 and a crop-discharge elevator section 18.

At its rear end, the machine is supported on landwheels 20 which are steerable through a hydraulic linkage (not shown) controlled from the cab of the towing tractor, the rear wheels of which are diagrammatically indicated at 21.

The crop-lifting shares at the front of the machine comprise two inwardly-rotating forwardly-inclined double disc shares 22,23. These have powered digging and scraper discs (not shown). A depth control roller 25 is designed to run centrally between the discs in the furrow between the potato-bearing ridges engaged by the disc shares.

Reference numeral 27 indicates the share-supporting sub-frame which is pivotally mounted at 29 on a main frame 31 for the primary web 33.

A jacking assembly 36 is provided for pivoting the sub-frame 27 to the chain-dot position at which the front section 12 will be clear of the ground for turning of the machine and road transport.

The web 33 is driven by a first hydraulic motor (not shown) whose speed can be varied from a remote control panel in the tractor cab.

The upper end of the primary web 33 all but overhangs a similarly constructed crop-conveying secondary web 40 which itself discharges on to a cross-conveyor 42.

A second hydraulic motor (not shown) connected in series with the first motor drives the secondary web 40 in its crop-conveying motion. A third hydraulic motor is used to drive the cross-conveyor 42.

A fourth hydraulic motor (not shown) drives two side-by-side crank wheels which in turn oscillate two crank arms 46 to activate an adjustable actuator device 50.

Although not apparent from the drawings, the actuator device 50 is connected between the supporting framework for web 33 and the supporting framework (not shown) for web 40 and it operates to cause mutually oppositely-directed in-plane vibrations of the two webs 33,40. This increases their effectiveness in separating out the crop from the soil.

The vibration amplitude of the secondary web can be adjusted by an appropriate adjustment of the variable drive 50, even down to zero, if required.

Figure 2:
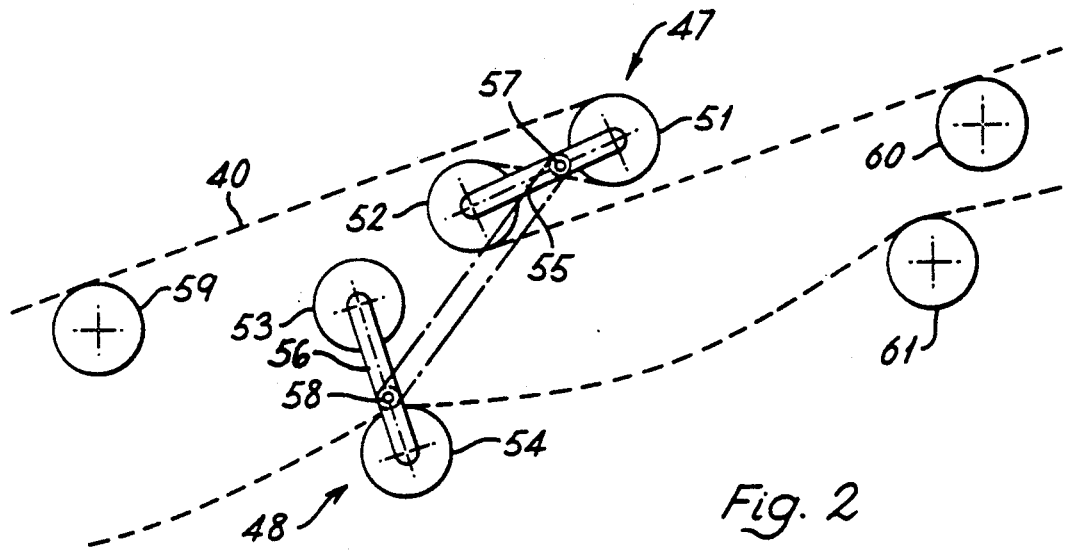
FIGS. 2 and 3 schematically illustrate, on a larger scale, the relative positions of step-defining rollers for use in the embodiment of FIG. 1.
Figure 3:
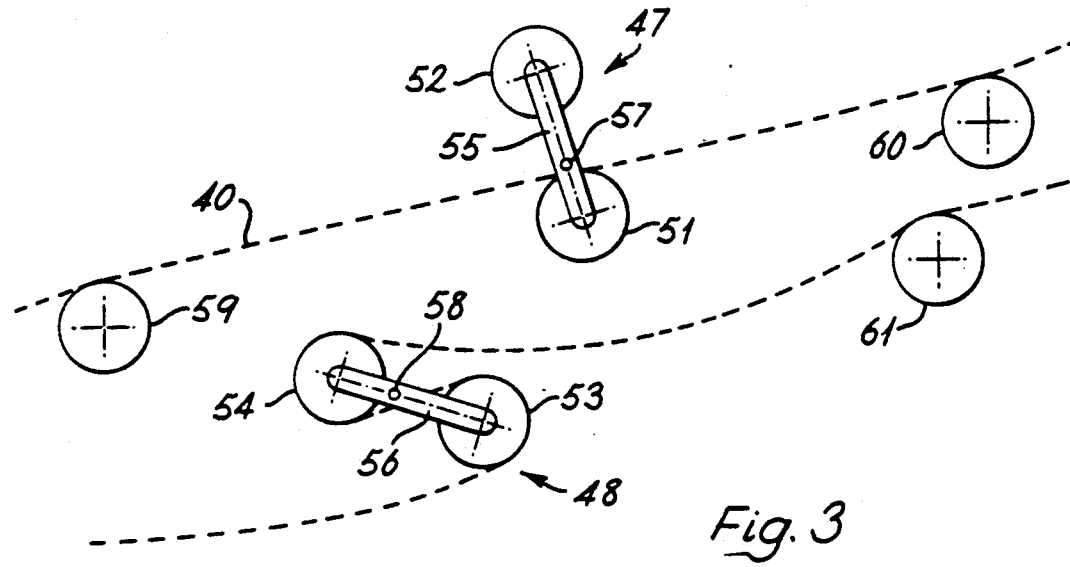

FIG. 1 shows an arrangement in which only the load-bearing runs of the primary and secondary conveyors have step sections 47 but FIGS. 2 and 3 show, in two different operational situations, a preferred arrangement in which each web has the potential for one or other of two such step sections at 47 and 48 for reasons whiCh will become apparent below.

Thus referring now to FIGS. 2 and 3, the step-defining assembly for the two top step-sections 47 shown in FIG. 1 each consists of two rollers 51,52 rotatably mounted at opposite ends of a pivoted link 55.

In accordance with the preferred modification of FIGS. 2 and 3, this roller assembly 51,52 is duplicated on the opposite side of the web-supporting frame by rollers 53,54 which are rotatably mounted at opposite ends of a second pivoted link 56.

The pivots for links 55 and 56 are provided by respective stub shafts 57 and 58 which are rotatably mounted in appropriate housings on the supporting framework for the web.

The purpose of the lower roller assemblies is to take up any slack appearing in the webs when the top step portion 47 is removed. In one arrangement, this can be done manually by first eliminating the top step portion 47 and then forming the lower step portion 48. In an alternative system, however, the shafts 57 and 58 are interconnected by an appropriate chain and sprocket link (not shown) so that any motion of the step-defining assembly for the top run of the webs is accurately mirrored by an appropriate compensating motion of the step-defining assembly for the return run.

Thus FIG. 2 shows the situation where the top roller assembly is operative to define the step section 47 and the lower roller assembly is inoperative. In the situation illustrated in FIG. 3, on the other hand, the top roller assembly is inoperative and the associated slack in the web has been taken up by the lower roller assembly which has now been reorientated to create the lower step section 48.

In use, if harvesting conditions do not require the extra sieving effect associated with the presence of a top step portion 47 in one or both of the two webs 33 and 40, then the associated top rollers are positioned as shown in FIG. 3, and idler rollers 59 and 60 together provide a substantially straight load-bearing run for the web or webs concerned. In this situation, the lower roller assembly will be orientated to define the lower step portion 48 with the result that the web will be tensioned as it leaves the lower idling roller 61.

In more difficult harvesting conditions, the step 47 can be brought into existence in one or both of the two webs by rotating the associated roller-supporting shafts 58 and 57 clockwise to the positions shown in FIG. 2. The clockwise rotation of shaft 58 will move the rollers 53 and 54 out of their step-defining relationship with the web while the clockwise rotation of shaft 57 will instead move the rollers 51 and 52 to a step-defining orientation in which they will take up the web slack released by the lower rollers so as to re-tension the web.

Further particulars of those parts of the apparatus which have been illustrated in FIG. 1 of the drawings but not specifically described above (or not described in any detail) may be obtained from the co-pending applications referred to earlier.

In alternative embodiments, not illustrated, the primary web 14 is stepless or has a fixed step and the step 47 in the secondary web 16 is either controllable as above described with reference to FIGS. 1 to 3 or is fixed.

In other alternatives, the step 47 in the primary web is controllable as above described with reference to FIGS. 1 to 3 and it is the secondary web that is either stepless or has a fixed step.

I claim:

1. A root crop harvester comprising:
   a support frame;
   a crop lifting front section mounted to said support frame;
   a soil-separating primary web mounted to said support frame for receiving material from said crop lifting front section; and
   a single crop-conveying second web mounted to said support frame;
   said soil-separating primary web being arranged to discharge material onto said crop-conveying second web, said second web passing about two rollers which may be moved into and out of a step defining relationship with a load-bearing run of the second web, so as to optionally provide an overhanging step section therein.

2. A harvester as claimed in claim 1 in which the second web is an intermediate web discharging on to a secondary web.

3. A harvester as claimed in claim 1 in which the primary web passes about two rollers adapted to define in a load-bearing run of the primary web an overhanging step section.

4. A root crop harvester including:
   a support frame;
   a crop-lifting front section mounted to said support frame; and
   a soil-separating primary web for receiving material from said crop-lifting front section, said soil-separating primary web passing about two rollers which may be moved into and out of a step-defining relationship with a load-bearing run of the primary web so as optionally to provide an overhanging step section therein.

5. A harvester comprising:
   a support frame;
   a crop lifting front section mounted to said support frame;
   a soil-separating primary web mounted to said support frame for receiving material from said crop lifting front section; and
   a crop-conveying second web mounted to said support frame;
   said soil-separating primary web being arranged to discharge material onto said crop-conveying second web, said second web passing about two rollers adapted to define, in a load-bearing run of the second web, an overhanging step section,
   the step-defining rollers being movable into and out of a step-defining relationship with the associated load-bearing run of the second web by having the step-defining rollers mounted one on each end of a link pivoted for controlled rotational displacement about a horizontal pivot axis.

6. A harvester as claimed in claim 5 in which a return run of the second web passes around a second pair of step-defining rollers arranged in similar fashion to the rollers of the load-bearing run, the two pairs of rollers being mounted on respective pivoted links which are so coupled that pivotal motion of the second pair of rollers compensates for changes in web path length brought about by pivotal motion of the first pair of rollers.

7. A harvester as claimed in claim 6 in which the pivot axis of each link is nearer the roller associated with the higher end of the step section.

8. A harvester as claimed in claim 5 in which the pivot axis of the link is nearer the roller associated with a higher end of the step section.

9. A harvester including:

a support frame;

a crop-lifting front section mounted to said support frame; and a soil-separating primary web for receiving material from said crop-lifting front section, said soil-separating primary web passing about two rollers which may be moved relative to a load-bearing run of the primary web so as optionally to provide an overhanging step section therein, the step-defining rollers being movable into and out of a step-defining relationship with the load-bearing run of the primary web by having the step-defining rollers mounted one on each end of a link pivoted for controlled rotational displacement about a horizontal pivot axis.

10. A harvester as claimed in claim 9 in which a return run of the primary web passes around a second pair of step-defining rollers arranged in similar fashion to the rollers of the load-bearing run, the two pairs of rollers being mounted on respective pivoted links which are so coupled that pivotal motion of the second pair of rollers compensates for changes in web path length brought about by pivotal motion of the first pair of rollers.

11. A harvester as claimed in claim 10 in which the pivot axis of each link is nearer the roller associated with a higher end of the step section.

12. A harvester as claimed in claim 9 in which the pivot axis of the link is nearer the roller associated with a higher end of the step section.

* * * * *

UNITED STATES PATENT AND TRADEMARK OFFICE
CERTIFICATE OF CORRECTION

PATENT NO.  : 5,031,703

DATED       : July 16, 1991

INVENTOR(S) : FLEMING

It is certified that error appears in the above-identified patent and that said Letters Patent is hereby corrected as shown below:

Col. 1, line 56, change "n" to -- in --.

Col. 2, line 67, change "whiCh" to -- which --.

Col. 3, lines 56 and 57, change "co-pending applications" to
                     -- British Patent Document --.

Signed and Sealed this

Fourteenth Day of September, 1993

Attest:

BRUCE LEHMAN

*Attesting Officer*   *Commissioner of Patents and Trademarks*